United States Patent
Ueno et al.

(10) Patent No.: US 9,184,638 B2
(45) Date of Patent: Nov. 10, 2015

(54) STATOR STRUCTURE AND STATOR MANUFACTURING METHOD

(75) Inventors: Yasuhiro Ueno, Toyota (JP); Joji Yoshimura, Toyota (JP); Koji Nakanishi, Konan (JP); Hisayoshi Chiba, Anjo (JP); Naoki Yoshida, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 433 days.

(21) Appl. No.: 13/636,065

(22) PCT Filed: May 26, 2010

(86) PCT No.: PCT/JP2010/058923
§ 371 (c)(1),
(2), (4) Date: Sep. 19, 2012

(87) PCT Pub. No.: WO2011/148476
PCT Pub. Date: Dec. 1, 2011

(65) Prior Publication Data
US 2013/0009495 A1    Jan. 10, 2013

(51) Int. Cl.
| | |
|---|---|
| H02K 3/18 | (2006.01) |
| H02K 15/02 | (2006.01) |
| H02K 3/52 | (2006.01) |
| H02K 3/44 | (2006.01) |
| H02K 15/12 | (2006.01) |

(52) U.S. Cl.
CPC .............. *H02K 3/522* (2013.01); *H02K 3/44* (2013.01); *H02K 15/12* (2013.01); *Y10T 29/49009* (2015.01)

(58) Field of Classification Search
CPC ......... H02K 15/12; H02K 3/44; H02K 3/522; Y10T 29/49009
USPC .................................................. 310/43, 54
See application file for complete search history.

(56) References Cited

U.S. PATENT DOCUMENTS

| | | | | |
|---|---|---|---|---|
| 3,505,729 | A * | 4/1970 | Balke et al. | 29/596 |
| 5,569,390 | A * | 10/1996 | Endo | 250/208.1 |
| 6,157,084 | A * | 12/2000 | Hino et al. | 257/773 |
| 6,414,413 | B1 * | 7/2002 | Arai et al. | 310/214 |
| 8,093,769 | B2 * | 1/2012 | Sonohara | 310/54 |
| 2002/0043880 | A1 * | 4/2002 | Suzuki et al. | 310/12 |

(Continued)

FOREIGN PATENT DOCUMENTS

| | | |
|---|---|---|
| CN | 1745507 A | 3/2006 |
| JP | 55103706 A * | 8/1980 |

(Continued)

OTHER PUBLICATIONS

Translation of foreign document JP 08098447 (Year: 1996).*

*Primary Examiner* — Alex W Mok
(74) *Attorney, Agent, or Firm* — Kenyon & Kenyon LLP

(57) ABSTRACT

A stator structure and a stator manufacturing method which are configured so that the stress occurring in resin-molded sections or insulators of the stator can be reduced. The structure of the stator is provided with coils formed by winding conductors, and also with stator cores provided with teeth to which the coils are mounted through the insulators. The coils mounted to the insulators are resin-molded and integrated with the insulators. Spaces which continue in the radial direction of the stator cores are formed between the insulators and end surface of the stator cores in the axial direction thereof. The insulators and the side surfaces of the teeth of the stator cores are adhered or welded (fusion bonded) to each other.

5 Claims, 12 Drawing Sheets

(56) References Cited

U.S. PATENT DOCUMENTS

| | | | |
|---|---|---|---|
| 2003/0160523 A1* | 8/2003 | Suzuki et al. | 310/43 |
| 2004/0256933 A1* | 12/2004 | Toyokawa et al. | 310/89 |
| 2005/0073209 A1* | 4/2005 | Koike | 310/201 |
| 2006/0145548 A1 | 7/2006 | Wakita | |
| 2007/0018528 A1* | 1/2007 | Naitou et al. | 310/218 |
| 2009/0015094 A1* | 1/2009 | Yoshitake | 310/257 |
| 2009/0079292 A1* | 3/2009 | Horiba et al. | 310/215 |
| 2009/0267441 A1* | 10/2009 | Hiramatsu et al. | 310/208 |
| 2009/0302694 A1 | 12/2009 | Asai | |
| 2011/0012445 A1 | 1/2011 | Nakanishi et al. | |

FOREIGN PATENT DOCUMENTS

| | | | |
|---|---|---|---|
| JP | 08098447 A * | | 4/1996 |
| JP | 2001268864 A | | 9/2001 |
| JP | 2002075070 A * | | 3/2002 |
| JP | 2004-248429 A | | 9/2004 |
| JP | 2006-032786 A | | 2/2006 |
| JP | 2007-195333 A | | 8/2007 |
| JP | 2007-215334 A | | 8/2007 |
| JP | 2008-160938 A | | 7/2008 |
| JP | 2008-312288 A | | 12/2008 |
| JP | 2009-148060 A | | 7/2009 |
| JP | 2009-148134 A | | 7/2009 |
| JP | 2009-171740 A | | 7/2009 |
| JP | 2009-219235 A | | 9/2009 |
| SU | 1775803 A1 * | | 11/1992 |
| WO | 2010140243 A1 | | 12/2010 |
| WO | 2011108098 A1 | | 9/2011 |

* cited by examiner

STATOR STRUCTURE AND STATOR MANUFACTURING METHOD

CROSS-REFERENCE TO RELATED APPLICATIONS

This is a 371 national phase application of PCT/JP2010/058923 filed on 26 May 2010, the entire contents of which are incorporated herein by reference.

FIELD OF THE INVENTION

The present invention relates to a technique for winding a coil on a stator to be used in a motor and, more particularly, to a technique for newly devising the procedure for insulatingly covering the coil to reduce manufacturing costs.

BACKGROUND OF THE INVENTION

Of vehicle-mounted motors, a motor to be used for driving a vehicle is demanded for size reduction and higher output power. To achieve a size-reduced and high-power motor, it is necessary to enhance magnetic power by for example increasing the amount of electric current to be supplied to a coil provided in a stator. However, as the current amount supplied to the coil is increased, a problem with heat dissipation comes about. Accordingly, for size reduction and higher power of a motor, it is necessary to study a method of effectively dissipating the heat generated in a stator during use.

Patent Document 1 discloses a technique related to a motor stator and a motor. A mixture of an insulating resin material such as polyimide resin and amide-imide resin and a filler material such as alumina and silica is applied on side surfaces of a teeth portion of a stator core to producing a coating of uniform thickness. Then, before this resin coating hardens, a wire is wound to form a coil. Since the mixture of insulating resin and filler is applied on the side surfaces of the teeth portion, forming the coating thereon, the contact or joining strength between the coil and the coating and the teeth portion is improved and thus the heat dissipation performance is enhanced.

However, even when the above technique for improving the heat dissipation performance is applied, if a conductor wire used to form a coil is a circular wire, the current amount allowed to be supplied to the wire has a limitation. The circular wire may be wound in pair to form a coil as a measure against the above disadvantage. However, to achieve high power of a stator, a coil space factor needs to be more increased.

Therefore, the use of a flat rectangular conductor wire ("flat wire") has been considered to be effective in improving the space factor. However, in the case of using the flat wire for a coil, it is hard to wind the flat wire that has to a wide cross sectional area into a coiled form. Such a flat wire having a wide cross sectional area enables an increase in current density, but causes a problem with eddy current. For this reason, various studies have been made to form a coil by winding a flat wire.

Patent Document 2 discloses a technique related to a split stator manufacturing method. Specifically, a flat wire is wound to form a coil and then this coil is mounted on an insulator. This assembly is placed in a die and subjected to resin molding, thereby forming a coil cassette unit in which the coil and the insulator are made integral by resin molding. This coil cassette unit is installed in a split-type stator core to complete a stator.

The stator completed as above can have good joining strength between the insulator and the coil, so that the heat generated in the coil during use of the stator can be efficiently transferred. Thus, the heat dissipation performance of the stator can be improved.

Patent Document 3 discloses a technique related to a split stator and a split-stator manufacturing method. When the insulator is to be insert-molded with respect to a teeth portion of a stator core, an adhesive is applied on side surfaces of the teeth portion in advance. After the insulator is formed, a coil is mounted and then the stator core is resin-molded.

Such application of the adhesive on the teeth side surfaces makes it possible to prevent alignment of fillers mixed in the resin for forming the insulator, thereby improving the heat conductivity of the insulator.

RELATED ART DOCUMENTS

Patent Documents

Patent Document 1: JP-A-2007-215334
Patent Document 2: JP-A-2009-171740
Patent Document 3: JP-A-2009-219235

SUMMARY OF THE INVENTION

Problems to be Solved by the Invention

However, Patent Documents 2 and 3 likely cause the following problems.

In forming a coil by winding a flat wire, a bent portion of the coil needs to a certain degree of a bent radius. This is because the flat wire has a predetermined cross sectional area. Although an edgewise bending coil is particularly effective to achieve high power of a motor, a bent portion of the edgewise bending coil has a larger bent radius than that of a coil not edgewise bent.

Such a configuration causes gaps between end faces of the stator core and an inner circumferential surface of the coil. Specifically, a flat wire having a large cross sectional area to allow a large amount of current to be supplied to the coil tends to generate a large gap between the coil and the stator core.

For the above reason, when the stator is manufactured by the techniques disclosed in Patent Documents 2 and 3, a large amount of resin flows in the gap between the coil and the end faces of the stator core when coil ends of the stator are resin-molded. Depending on the cross sectional area of a flat rectangular cross section of the flat wire and the bent radius of the coil end portion, inner stress resulting from heat is accumulated in a resin-molded portion during use of the motor, causing cracks therein, thus damaging insulation between the coil and the stator core.

A vehicle-mounted motor generates heat during use, but is cooled to an ambient temperature except during use. Accordingly, the resin-molded portion and the insulator in the stator are frequently exposed to heat cycle load under usage environment. Since the resin and the coil and the stator core have different expansion coefficients, a contraction rate of resin increases as the resin-molded portion is made of a large amount of resin. This results in accumulation of stress in the resin of the stator under the motor usage environment, thus causing cracks.

The present invention has been made to solve the above problems and has a purpose to provide a stator structure and a stator manufacturing method capable of reducing stress to be generated in a resin-molded portion or an insulator of a stator.

Means of Solving the Problems

To achieve the above purpose, one aspect of the invention provides a stator structure configured as below.

(1) In a stator structure including a coil formed of a wound conductor wire and a stator core provided with a teeth on which the coil is mounted through an insulator, the insulator includes a sleeve portion to be placed in contact with the side surface of the teeth portion, the insulator and the coil inserted on the sleeve portion of the insulator and mounted on the insulator are resin-molded to be integral or united with each other, and a space is formed between the insulator and an end face of the stator core in an axial direction, the space being continuous in a radial direction of the stator core.

(2) In the stator structure described in (1), preferably, the insulator and a side surface of the teeth portion of the stator core are bonded or welded to each other.

(3) In the stator structure described in (2), preferably, the side surface of the teeth portion of the stator core and the insulator are fixed to each other by ultrasonic welding.

(4) In the stator structure described in (2), preferably, the side surface of the teeth portion of the stator core and the insulator are fixed to each other by heat welding.

Furthermore, to achieve the above purpose, another aspect of the present invention provides a stator manufacturing method configured as below.

(5) In a stator manufacturing method of forming a stator by mounting a coil on a teeth portion formed in a stator core through an insulator, the method comprises: placing the insulator in a molding die, the insulator having been formed in a shape that contacts with a side surface of the teeth portion and provides a space between the insulator and an end face of the teeth portion, mounting the coil on the insulator, injecting resin into the molding die to cover a surface of the coil by resin molding to form a coil unit, and mounting the coil unit on the teeth portion of the stator core, and bonding or welding the coil unit and the side surface of the teeth portion to form the stator.

(6) In the stator manufacturing method described in (5), preferably, the resin used to cover the surface of the coil by resin molding is different from a resin used to form the insulator.

(7) In the stator manufacturing method described in (5) or (6), preferably, a portion of the insulator exposed to an inner peripheral surface of the coil unit and the side surface of the teeth portion of the stator core are joined to each other by one of adhesive, heat welding, and ultrasonic welding.

(8) In the stator manufacturing method described in (7), preferably, the coil unit is joined by applying uniform pressure to the coil unit from an inner diameter side of the stator core.

Effects of the Invention

The stator configured as above in one aspect of the invention can provide the following operations and effects.

According to the configuration described in (1), in a stator structure including a coil formed of a wound conductor wire and a stator core provided with a teeth portion on which the coil is mounted through an insulator, the insulator includes a sleeve portion to be placed in contact with a side surface of the teeth portion, the insulator and the coil inserted on the sleeve portion of the insulator and mounted on the insulator are resin-molded to be integral with each other, and a space is formed between the insulator and an end face of the stator core in an axial direction, the space being continuous in a radial direction of the stator core.

Since the coil is mounted on the insulator, and the coil and the insulator are resin-molded, the insulator and the coil are made integral by resin-molding. At that time, owing to the space provided between the insulator and the end face of the stator core, stress concentration indicated in Background section can be restrained. The reason why stress concentrates in the resin-molded portion covering the coil is because the resin-molded portion and the insulator have largely different thermal expansion coefficients from that of the stator core, thereby causing stress concentration in some portions under usage environment of a motor.

According to researches by the present applicant, it is found that stress concentrates at four corners of the teeth portion of the stator core. This seems because a large amount of resin is necessary in the area between the stator core end face and the coil in a conventional art. It is estimated that the resin present in the space shrinks or contracts, causing stress concentration at four corners of the teeth portion.

However, in the present invention, the space is formed between the insulator and the stator core end face to reduce a contact portion between the stator core end face and the insulator and reduce an amount of resin in the area between the stator core end face and the coil. Consequently, even under usage environment of a motor, it is possible to restrain stress generation resulting from a difference in heat thermal expansion coefficient between the resin-molded portion and the insulator and the stator core.

In the configuration described in (2), in the stator structure (1), the insulator and a side surface of the teeth portion of the stator core are bonded or welded to each other. The function of preventing the coil from moving relative to the stator when the stator is vibrated is achieved by bonding or welding of the stator core and the insulator at the side surface of the teeth portion.

The technique related to a conventionally used cassette coil uses a mechanical joining method achieved by providing an insulator or a resin-molded portion with a protrusion engageable with the stator core and providing the stator core with a recess. However, such a method is apt to cause disadvantages for heat dissipation from the coil, for example, a gap is generated in the insulator and the stator core.

In contrast, the insulator and the side surface of the teeth portion are bonded or welded to each other, so that the insulator and the stator core can closely contact with each other. This can contributes to improvement of heat dissipation property.

In the configuration described in (3), in the stator structure (2), the side surface of the teeth portion of the stator core and the insulator are fixed to each other by ultrasonic welding.

Since the insulator and the teeth side surface are fixed to each other by ultrasonic welding, an air layer is less likely to be generated between the insulator and the teeth side surface and hence the heat dissipation performance can be enhanced.

In the configuration described in (4), in the stator structure (2), the side surface of the teeth portion of the stator core and the insulator are fixed to each other by heat welding.

Since the insulator and the teeth side surface are fixed to each other by heat welding, as in (3), an air layer is less likely to be generated between the insulator and the teeth side surface and hence the heat dissipation performance can be enhanced.

Furthermore, the stator manufacturing method configured as above in one aspect of the invention can provide the following operations and effects.

According to the configuration described in (5), in a stator manufacturing method of forming a stator by mounting a coil on a teeth portion fainted in a stator core through an insulator, the method comprises: placing the insulator in a molding die, the insulator having been formed in a shape that contacts with a side surface of the teeth portion and provides a space between the insulator and an end face of the teeth portion, mounting the coil on the insulator, injecting resin into the molding die to cover a surface of the coil by resin molding to faun a coil unit, and mounting the coil unit on the teeth portion of the stator core, and bonding or welding the coil unit and the side surface of the teeth portion to farm the stator.

The insulator and the end face of the stator core are formed with the space therebetween. The coil is mounted on the insulator and insert-molded to form the coil unit. Accordingly, as with the stator structure disclosed in (1), the stress concentration indicated in Background section can be restrained.

Specifically, the insulator and the stator core end face are configured to include the space therebetween. It is therefore possible to restrain the stress from accumulating in the portions of the insulator and the resin-molded portion corresponding to four corners of the teeth portion as indicated in Background section. This contributes to lengthen the life of the stator.

In the configuration described in (6), in the stator manufacturing method (5), the resin used to cover the surface of the coil by resin molding is different from a resin used to form the insulator.

Since the insulator and the resin-molded portion covering the coil can be made of different resins, the insulator and the resin-molded portion can have different functions from each other. For instance, in the case of a motor for driving, most of the heat amount generated in the coil is dissipated to the core via the insulator. Therefore, the insulator is made of a high heat conductive resin, while the molded portion needing a larger amount of resin than the insulator may be made of an inexpensive resin. This can contribute to cost reduction of the stator.

In the configuration described in (7), in the stator manufacturing method (5) or (6), a portion of the insulator exposed to an inner peripheral surface of the coil unit and the side surface of the teeth portion of the stator core are joined to each other by one of adhesive, heat welding, and ultrasonic welding.

The teeth side surface of the stator core and the insulator are joined to each other by bonding, heat welding, or ultrasonic welding. Accordingly, the coil unit can closely contacts with the stator core, enabling efficient transfer of the heat generated in the coil to the stator core.

Furthermore, the coil unit can be held against movement even when the stator is vibrated, thereby preventing the insulator and the teeth side surface from rubbing each other, leading to deterioration in insulation property.

In the configuration described in (8), in the stator manufacturing method (7), the coil unit is joined by applying uniform pressure to the coil unit from an inner diameter side of the stator core.

When the coil unit is set on and is to be joined to the stator core, uniform pressure is applied from the inner diameter side of the stator core. When the coil unit is welded, therefore, the resin that forms the surface of the coil unit is softened once and then hardened. This can prevent the stator core from becoming deformed even when a force occurs in the stator core.

The stator core is made of laminated steel sheets. In some cases, therefore, a slight gap is generated between laminated steel sheets according to a method of forming the laminated steel sheets. When the coil unit in such a state is mounted on the teeth portion and subjected to welding, the stator core may receive a force resulting from the force generated when the resin is hardened. The coil unit is placed on the inner diameter side of the stator core, so that the outer diameter side of the stator core is in a free state. Accordingly, this force may compress and deform the teeth portion placed inside of the stator core. However, the joining is performed while applying uniform pressure from the inner diameter side of the stator core, thereby restraining the deformation due to this force.

DETAILED DESCRIPTION

A detailed description of a first embodiment of the present invention will now be given.

First Embodiment

Figure 1:
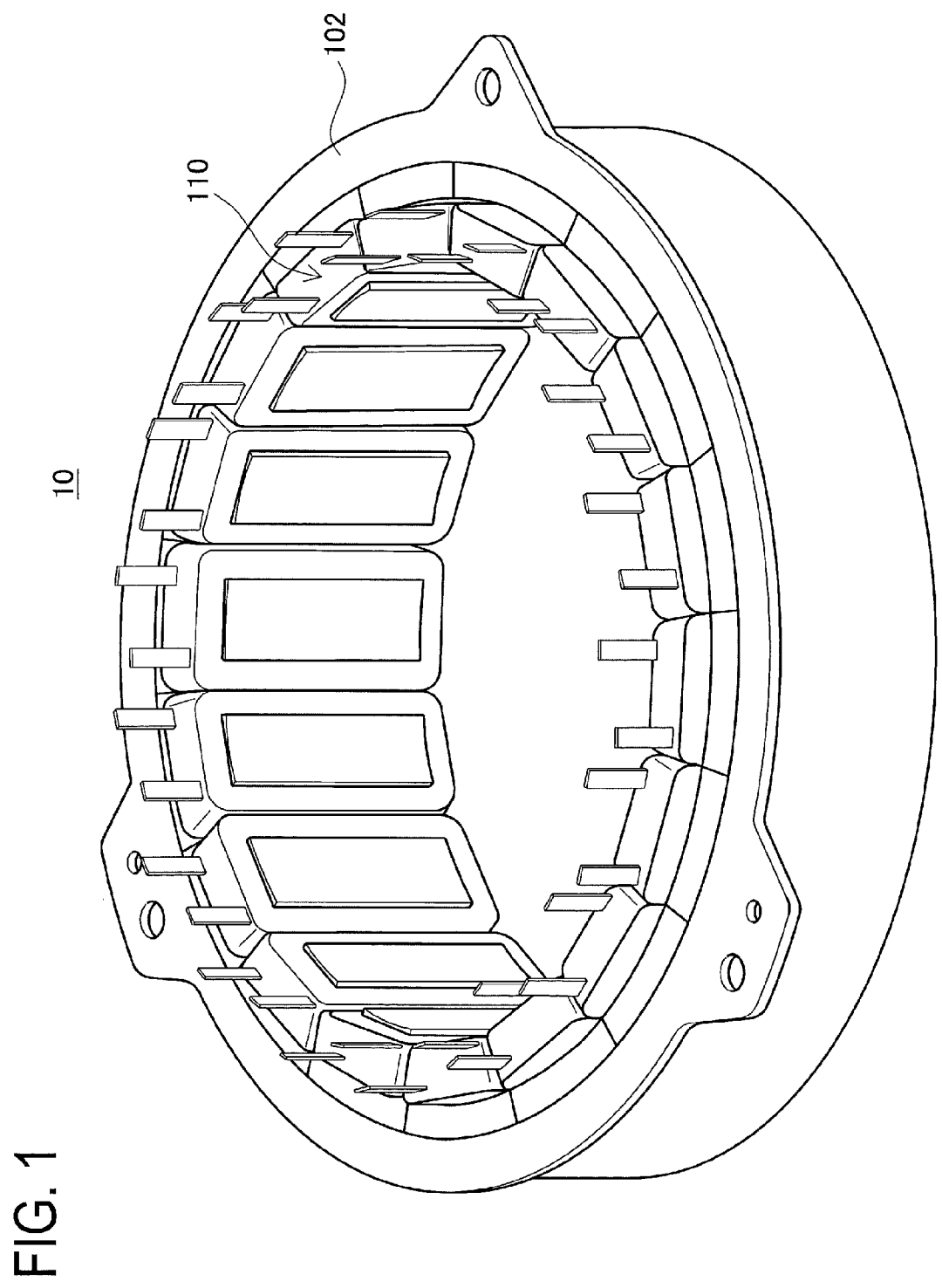
FIG. 1 is a perspective view of a stator of a first embodiment.
Figure 2:
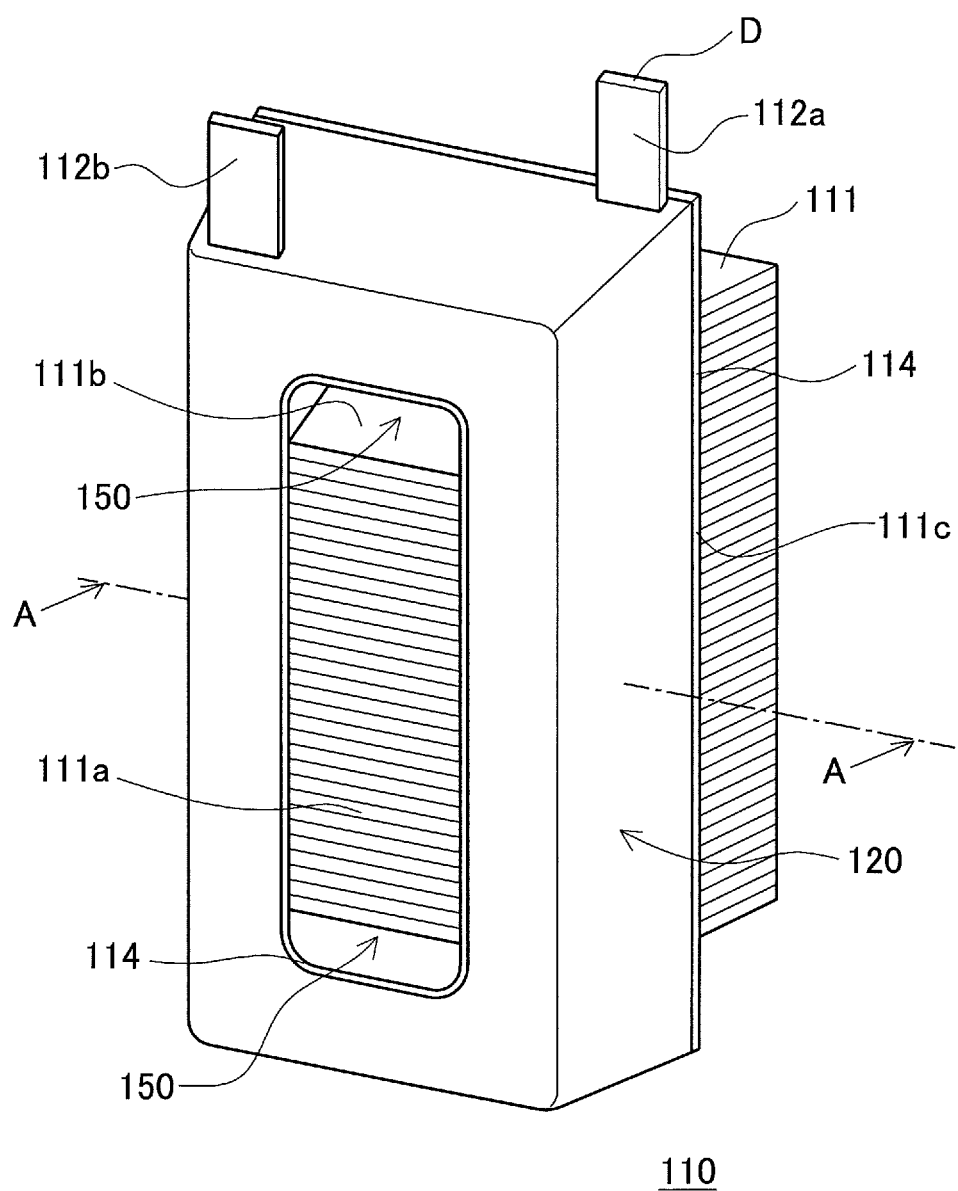
FIG. 2 is a perspective view of a split-core unit of the first embodiment.
Figure 3:
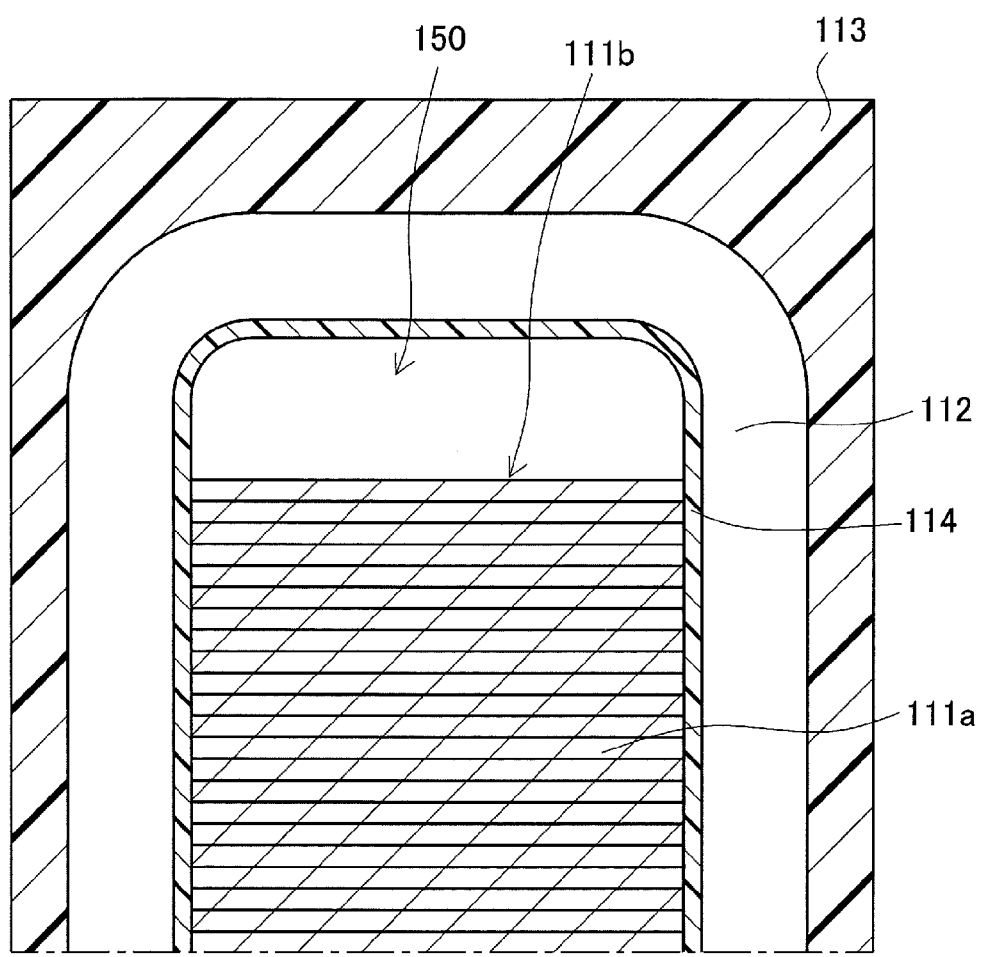
FIG. 3 is a cross sectional view of the split-core unit of the first embodiment.

FIG. 1 is a perspective view of a stator 10 of the first embodiment. FIG. 2 is a perspective view of a split-core unit 110. FIG. 3 is a cross sectional view of the split-core unit 110. The stator 10 includes a split-type stator core consisting of eighteen split-core units 110 shown in FIG. 2 that are arranged in an annular form. Each split-core unit 110 includes a stator core piece ("core piece") 111, a coil 112 made of a flat rectangular conductor wire ("flat wire") D wound by edgewise bending, a resin-molded portion 113, and an insulator 114. An outer ring 102 is fitted on the outer periphery of the split-core units 110.

The core piece 111 is made of a plurality of magnetic steel sheets formed by press or other techniques and laminated so that a teeth portion 111a protrudes to an inner periphery side. End faces of the core piece 111 are defined as core end faces 111b which are one surfaces located at both ends of the laminated magnetic steel sheets. Slot bottom portions 111c are formed on both sides of the teeth portion 111a in a circumferential direction.

Figure 4:
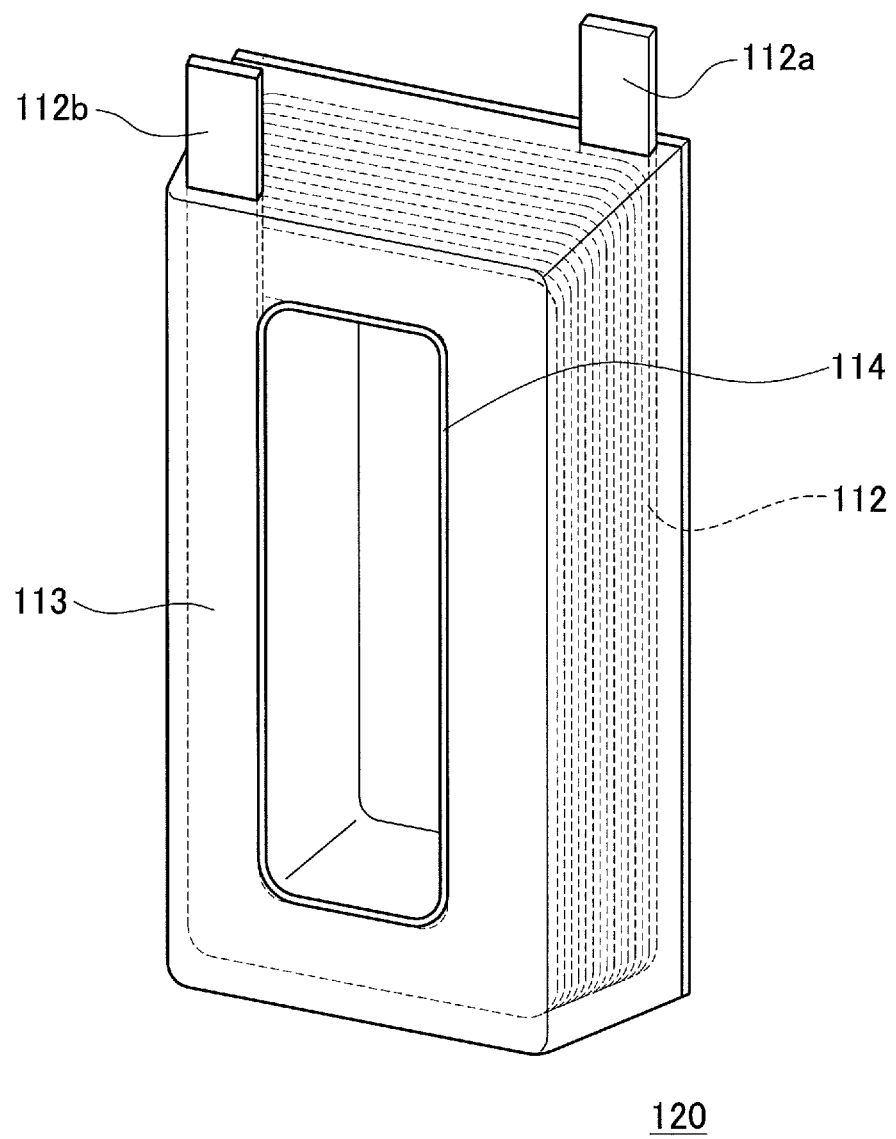
FIG. 4 is a perspective view of a coil unit of the first embodiment.

A coil unit 120 is mounted on the teeth portion 111a of the core piece 111. FIG. 4 is a perspective view of the coil unit 120. The coil unit 120 includes the coil 112 and the insulator 114 as shown in FIG. 3, and further the resin-molded portion 113 covering the coil 112.

The coil 112 is made by edgewise bending the flat wire D and has an outside coil terminal 112a and an inside coil terminal 112b on the coil end side. The flat wire D is made of a high conductive metal such as copper having a rectangular cross section and coated with insulating resin such as enamel.

The resin-molded portion 113 and the insulator 114 are made of thermoplastic resin such as PPS resin. However, the insulator 114 contains a large amount of filler in order to enhance its heat conductivity, while the resin-molded portion 113 contains a lower content ratio of filler than the insulator 114. To provide a welding allowance to be used for ultrasonic welding which will be mentioned later, the insulator 114 is designed so that portions that contact with the side surfaces of the teeth portion 111a and the slot bottom portions 111c shown in FIG. 3 have large thickness by 0% to 40% than other portions.

Figure 5:
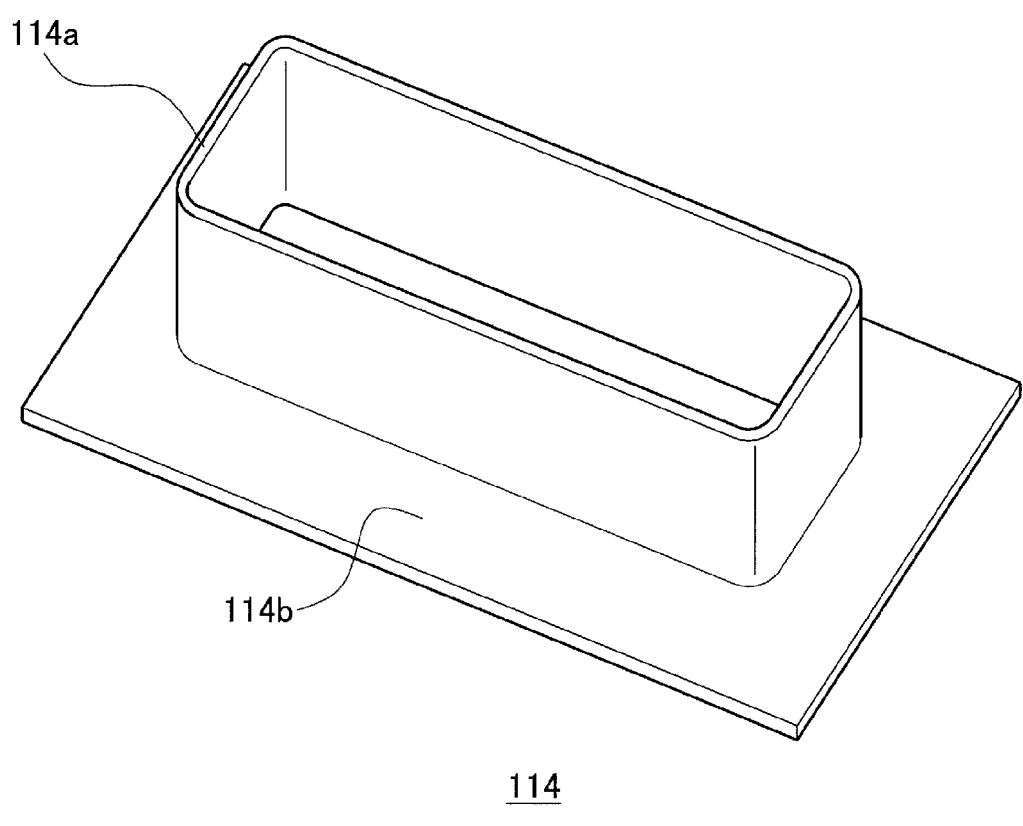
FIG. 5 is a perspective view of an insulator of the first embodiment.

FIG. 5 is a perspective view of the insulator 114. The insulator 114 consists of a sleeve portion 114a having an almost rectangular cross section and a plate-like portion 114b formed of a flat plate, which are integrally made by use of molding dies mentioned later. The sleeve portion 114a serves to provide insulation between the coil 112 and the teeth portion 111a in the completed split-core unit 110. The plate-like portion 114b serves to provide insulation between the coil 112 and the slot bottom portions 111c.

Figure 6:
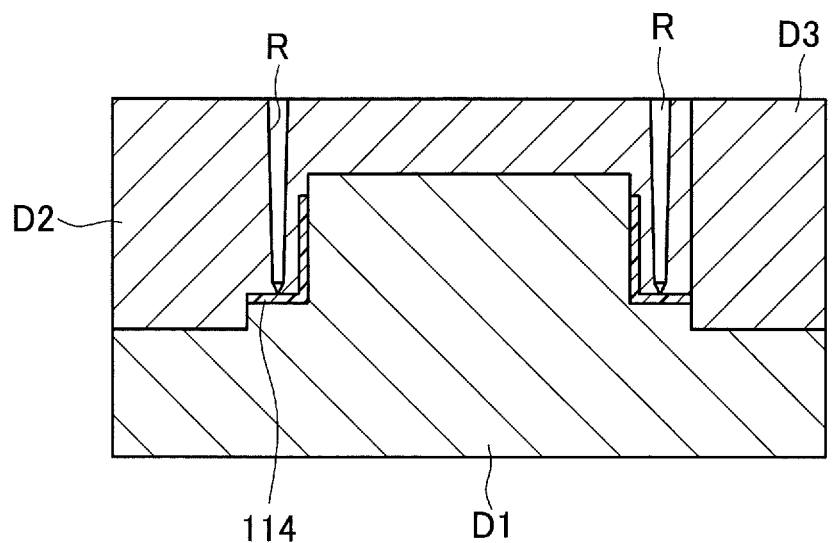
FIG. 6 is a cross sectional view showing how to form the insulator with molding dies in the first embodiment.
Figure 7:
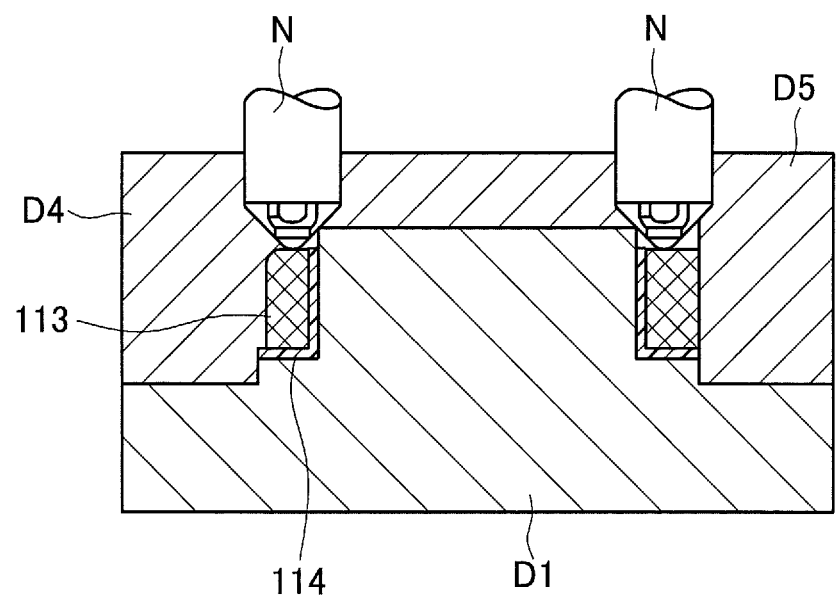
FIG. 7 is a cross sectional view showing how to form a resin-molded portion in the first embodiment.
Figure 8:
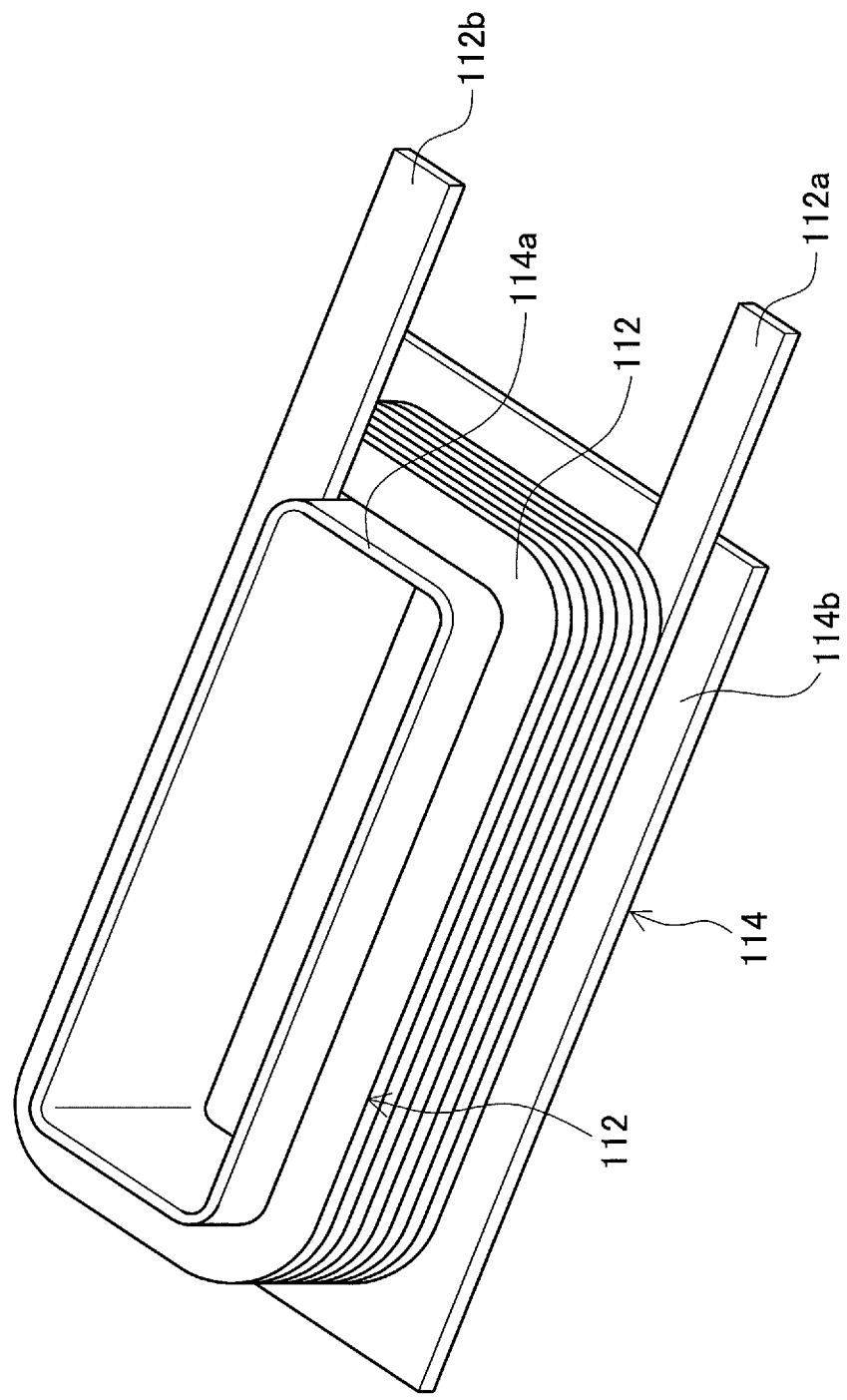
FIG. 8 is a perspective view showing a state where a coil is mounted on the insulator in the first embodiment.

A process of forming the coil unit 120 will be explained below. FIG. 6 is a cross sectional view showing how to form the insulator 114 with molding dies. FIG. 7 is a cross sectional view showing how to form the resin-molded portion 113. FIGS. 6 and 7 show cross sections taken at the center of short sides of the coil 112 and the insulator 114 placed in the dies. FIG. 8 is a perspective view showing a state where the coil 112 is mounted on the insulator 114.

Then, resin is injected into a cavity defined by the first die D1, second die D2, and third die D3 through pouring gates R, forming the insulator 114. As a result, the insulator 114 having the shape shown in FIG. 5 is formed on the first die D1.

Figure 9:
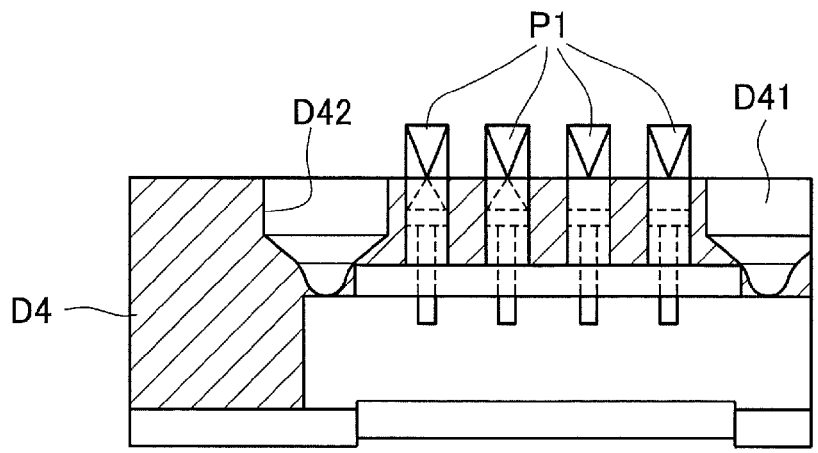
FIG. 9 is a side sectional view of a fourth die in the first embodiment.
Figure 10:
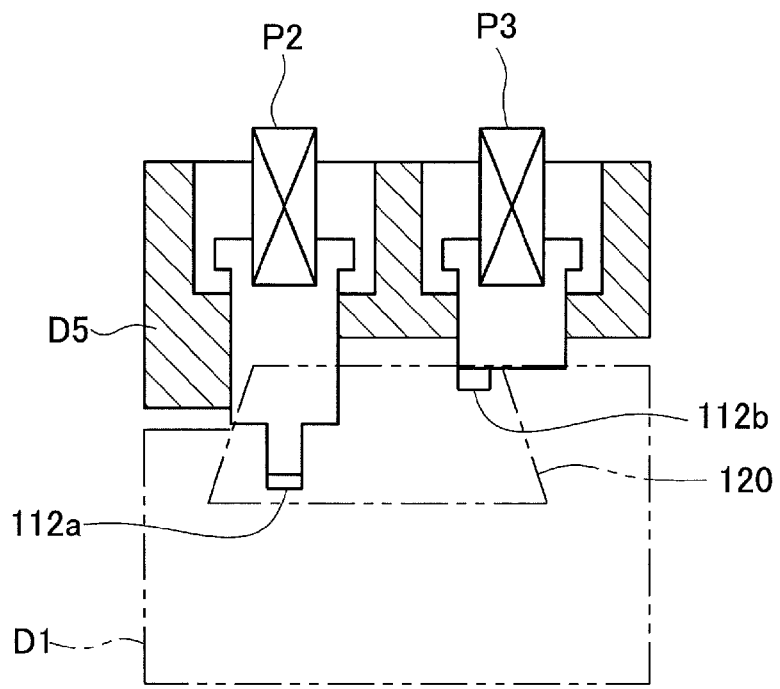
FIG. 10 is a side sectional view of a fifth die in the first embodiment.

While the insulator 114 is held on the first die D1, the coil 112 is set on the insulator 114 as shown in FIG. 8. A fourth die D4 and a fifth die D5 are moved to respective predetermined positions. FIG. 9 is a side cross sectional view of the fourth die D4, which is a side cross section of the fourth die taken at the center of short sides. FIG. 10 is a side cross sectional view of the fifth die D5, which is a cross section of the fifth die taken at a lead-side coil end of the coil unit 120. The fourth die D4 is provided with a total of eight coil pressure pins P1, which are arranged in four points of each long side of the coil 112. The fourth die D4 is further provided with a lead-side recess D41 and a non-lead-side recess D42 in which nozzles N are to be inserted.

The fifth die D5 is provided with an outside-end pressure pin P2 for pressing the outside coil terminal 112a of the coil 112 and an inside-end pressure pin P3 for pressing the inside coil terminal 112b.

The coil pressure pins P1, the outside-end pressure pin P2, and the inside-end pressure pin P3 are individually provided with springs to press the coil 112 against the first die D1. The coil pressure pins P1 serve to press the coil 12 against separation from the insulator 114. The outside-end pressure pin P2 and the inside-end pressure pin P3 serve to hold the outside coil terminal 112a and the inside coil terminal 112b in respective predetermined positions.

Then, resin is injected into a cavity defined by the first die D1, fourth die D4, and fifth die D5 from the nozzles N, thus forming the resin-molded portion 113. The coil unit 120 is completed in the above manner.

Figure 11:
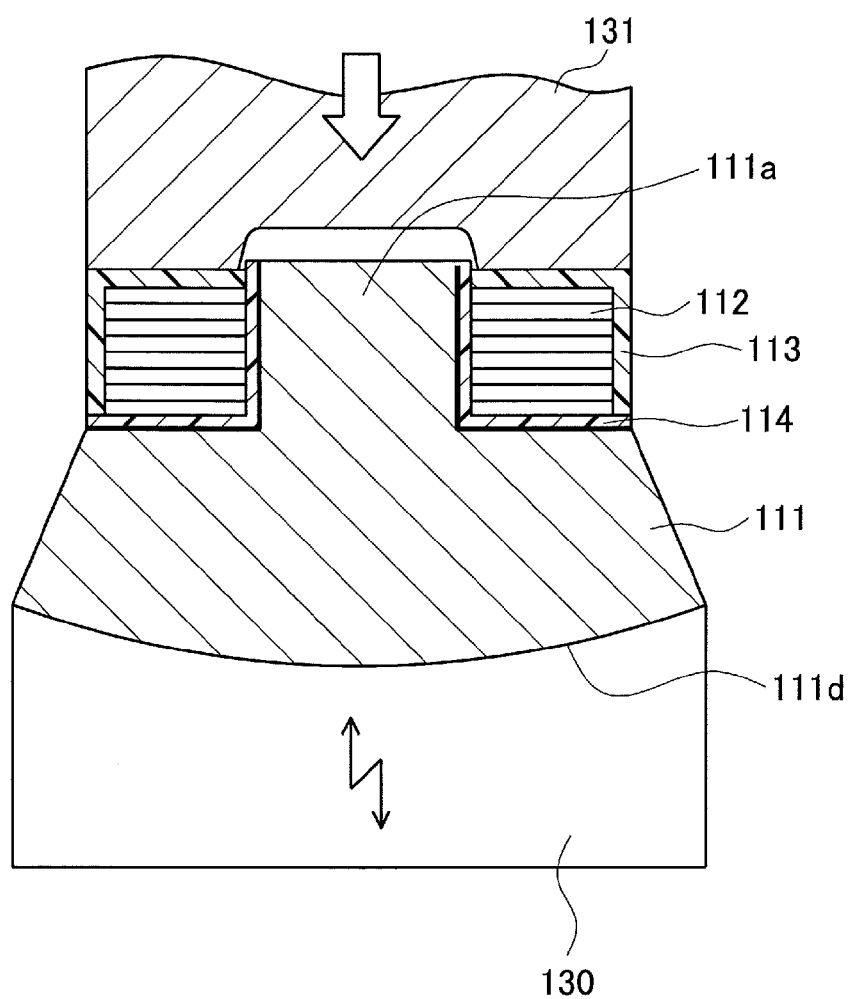
FIG. 11 is a cross sectional view showing how to weld the coil unit in the first embodiment.

A procedure of welding the coil unit 120 to the core piece 111 will be explained below. FIG. 11 is a cross sectional view showing how to weld the coil unit 120. The coil unit 120 having the resin-molded portion 113 formed in the above manner so that the coil 112 covered by the insulator 114 and the resin-molded portion 113 is mounted on the teeth portion 111a of the core piece 111 to constitute the split-core unit 110 shown in FIG. 2.

An ultrasonic vibrator 130 is placed in contact with an outer peripheral surface 111d of the core piece 111. Further, a pressure unit 131 pressurizes the coil unit 120 from the inner periphery side of the split-core unit 110.

The coil unit 120 is pressurized by the pressure unit 131 so that the coil unit 120 is pressed uniformly against the slot bottom portions 111c of the core piece 111. The ultrasonic vibrator 130 is activated in this state to ultrasonically weld the coil unit 120 to the side surfaces of the teeth portion 111a and the slot portions 111c of the core piece 111.

Even though it is not illustrated, the coil unit 120 is welded to the teeth portion 111a of the core piece 111 while the coil unit 120 is positioned in place so that a space 150 defined by the core end face 111b is generated uniformly on each end face of the core piece 111. This space 150 is formed to extend through the split-core unit 110 in its radial direction from the inner periphery side to the outer periphery side.

Each split-core unit 110 is completed as above. A plurality of the split-core units 110 are arranged in an annular form. Then, the outer ring is placed and shrink-fitted on the outer periphery of the split-core units 110 to keep the annular form thereof. The outside coil terminal 112a and the inside coil terminal 112b each protruding from a coil end of each split-core unit 110 are welded to bus bars not shown to electrically connect the coils 112. In the first embodiment, the stator 10 is a three-phase stator.

The stator 10 of the first embodiment configured as above can provide the following operations and effects. One of the effects of the stator structure and the stator manufacturing method of the first embodiment is to reduce stress concentration in the coil ends of the stator 10. The stator structure of the first embodiment includes the coils 112 each formed of the wound flat wire D and the split-core units 110 having the teeth portions on which the coils 112 are mounted through the insulators 114. The coils 112 mounted on the insulators 114 are integrally resin-molded. The continuous space is provided between the insulator 114 and each end face 111b to extend in the radial direction of the split-core unit 110. The insulator 114 and the side surfaces of the teeth portion 111a of the split-core unit 110 are bonded or welded to each other.

Figure 12:
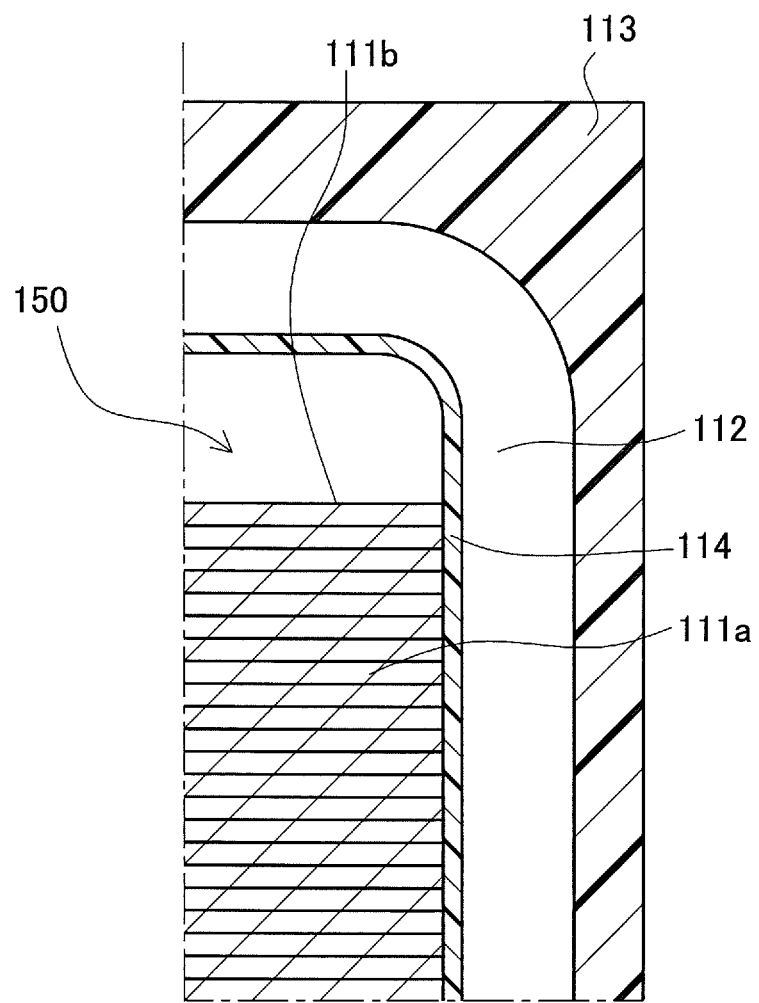
FIG. 12 is a cross sectional view of the coil in the first embodiment.
Figure 13:
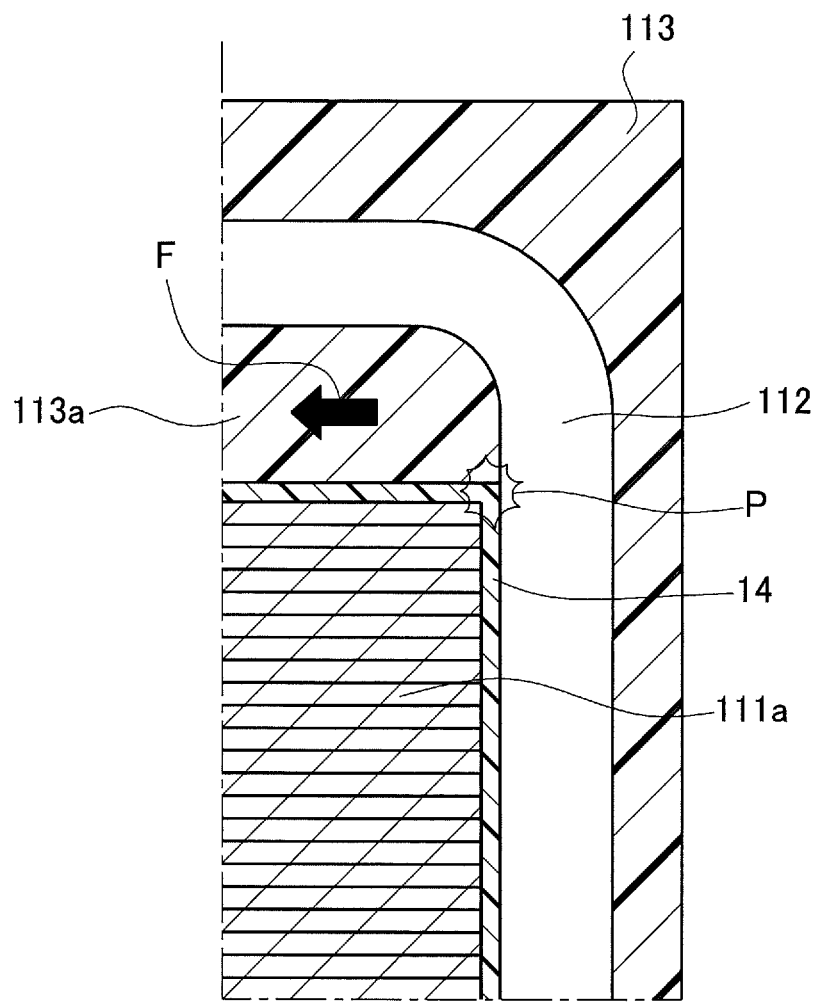
FIG. 13 is a cross sectional view of a coil in a conventional art, prepared for comparison.

FIG. 12 is a cross sectional view of the coil 112 of the first embodiment, corresponding to a partial enlarged view of FIG. 2. FIG. 13 is a cross sectional view of a coil 112 in a conventional art prepared for comparison.

In the case where a resin-molded portion 113 is formed in each coil end of a stator in the conventional art, as indicated in Background section, contraction force F is generated as shown in FIG. 13 in an end-face contact portion 113a that contacts with the end face 111b of the core piece 111 through an insulator 14. Herein, the end-ace contact portion 113a represents a lump of resin surrounded by the inner circumferential surface of the coil 112 and the insulator 14 that contacts with the teeth portion 111a. The end-face contact portion 113a made of resin and the insulator 14 are in close contact relation.

Under usage environment of the motor containing the stator 10, the core piece 111, the end-face contact portion 113a, and the insulator 14 have different thermal contraction rates, so that inner stress is generated in the resin-molded portion 113 and the insulator 14.

In particular, at a corner portion P in each of four corners of the teeth portion 111a, the end-face contact portion 113a has a large volume and thus causes a large contraction amount. Thus, stress is likely to concentrate on or around the corner portion P of the insulator 114 and the resin-molded portion 113.

However, in the case of adopting the stator structure of the first embodiment, the space 150 is formed on each end of the teeth portion 111a as shown in FIG. 12, in which no resin contacts with each end face 111b. Thus, the contraction force F mentioned as a conventional problem does not occur. Accordingly, the stress concentration can be prevented from occurring in the resin-molded portion 113 and the insulator 114.

Since the occurrence of stress concentration can be avoided, the service life of the stator 10 is expected to increase.

In the case where the stator 10 formed with the resin-molded portion 113 according to the conventional art is mounted in a motor, stress concentrates at the corner portions P under usage environment of the motor, thereby likely damaging the insulation of the insulator 114 or the resin-molded portion 113. If the insulation between the coil 112 and the core piece 111, which is provided by the insulator 114, cannot be ensured, the life of the motor containing such a stator 10 is apt to decrease.

In the stator structure of the first embodiment, the occurrence of stress concentration is restrained and thus the decrease in insulation at the corner portions P can be prevented. This can consequently contribute to long life of a motor containing the stator 10.

Another effect obtained by using the stator structure of the first embodiment is to reduce the weight of the stator 10. Since the spaces 150 are provided in two positions of each split-core unit 110, the amount of resin to form the resin-molded portion 113 in each split-core unit 110 can be reduced. This can contribute to weight reduction of each split-core unit 110.

The weight of the space 150 in one position is slight as compared with the total weight of each split-core unit 110. However, the spaces 150 are provided in two portions in each split-core unit 110 and a plurality of such split-core units 110 are arranged for the stator 10. In the case of using eighteen split-core units 110 for a stator 10, therefore, the spaces 150 are formed in thirty-six positions, resulting in some degree of weight reduction.

Since the spaces 150 are formed in the stator 10, the amount of resin necessary to faun the resin-molded portions 113 can be reduced simply. This contributes to cost reduction of the stator 10.

The spaces 150 extend through the split-core units 110 from the inner periphery side to the outer periphery side. Accordingly, when coolant or the like is supplied to those spaces 150, the stator 10 can have a high cooling effect.

Heat generated in the stator 10 used in a motor includes two types of heat, one is the heat derived from resistance heat generated when the coil 112 is energized and the other is the heat transferred from outside. For instance, in the case of a motor used for driving, the heat generated from the coil 112 is transferred mainly to the teeth portion 111a of the core piece 111 through the insulator 114 and thus dissipated therefrom.

Accordingly, the end face 111b is directly exposed to the coolant, so that the cooling efficiency can be improved. Furthermore, the portions of the coil 112 protruding on the coil end side are exposed to the coolant through the insulator 114.

Thus, high cooling efficiency is expected. The spaces 150 are formed radially in the stator 10 and thus advantageous to usage of the coolant.

Another effect obtained by using the stator structure of the first embodiment is to improve heat conductivity from the insulator 114 to the teeth portion 111a. The insulator 114 and the teeth portion 111a are welded to each other by the ultrasonic welding as mentioned above. Since the insulator 114 is welded to the core piece 111, an air layer is less likely to be generated between the insulator 114 and the core piece 111. Thus, the factors that diminish the heat conductivity can be reduced.

In a conventional art adopting a stator structure of a coil cassette type, a mechanical joining method is used in many cases in which a stator core end face is partially formed with a recess and an insulator or resin-molded portion of a coil unit is partially formed with a protrusion, and the protrusion is fitted in the recess.

According to such a method, however, it is unavoidable to generate air layers in portions corresponding to between the side surfaces of the teeth portion 111a and the coil unit 120 in the stator 10 of the first embodiment, that is, between the side surfaces of the teeth portion 111a and the sleeve portion 114a of the insulator 114 that faces the teeth portion 111a.

The air layers interfere with heat transfer and disturb heat dissipation from the stator 10. The structure of the stator 10 of the first embodiment adopting a welding method to fix the core piece 111 to the coil unit 120 can prevent the generation of such air layers.

In the conventional method, in which the protrusion formed in the coil unit is fitted in the recess formed in the core piece, for example, a part of the protrusion formed extending from the coil unit may be broken. In contrast, the stator 10 of the first embodiment in which the coil unit 120 and the core piece 111 are joined by ultrasonic welding can solve the above problem.

The use of the stator structure of the first embodiment can provide an effect that the insulator 114 and the resin-molded portion 113 can be made of different resin materials. This contributes to cost reduction.

In the motor used for driving, for example, the insulator 114 needing to serve to ensure insulation between the coil 112 and the core piece 111 and to ensure heat transfer from the coil 112 to the core piece 111 is made of resin containing filler at a large content ratio to ensure insulation performance as well as heat transfer performance. On the other hand, since the insulator can be made as a single piece by injection molding, the resin for the insulator does not need much fluidity and is relatively easily molded.

On the other hand, the resin-molded portion 113 has to be fowled by having resin enter in gaps or clearances of the coil 112. Accordingly, the resin for the resin-molded portion 113 needs fluidity, but does not need so high heat transfer performance. Also, the resin-molded portion 113 does not need so high insulation performance as compared with the insulator 114.

Therefore, two-color molding is conducted as indicated in the stator manufacturing method of the first embodiment, and thus the insulator 114 and the resin-molded portion 113 can be made of different materials. To be concrete, the amount of filler mixed in the resin to form the resin-molded portion 113 can be smaller than in the insulator 114 and/or the resin itself to form the resin-molded portion 113 can be different in kind from the resin to form the insulator 114. This contributes to cost reduction of the stator 10.

A second embodiment of the invention will be explained below.

Second Embodiment

The second embodiment is substantially identical to the first embodiment excepting a method of joining the coil unit 120 and the core piece 111 in the process of forming the split-core unit 110. In the second embodiment, specifically, the coil unit 120 and the core piece 111 are joined to each other by heat welding, instead of ultrasonic welding. The heat welding can simplify facilities. However, it is necessary to make the insulator 114 of a thermoplastic resin having high bonding strength.

Figure 14:
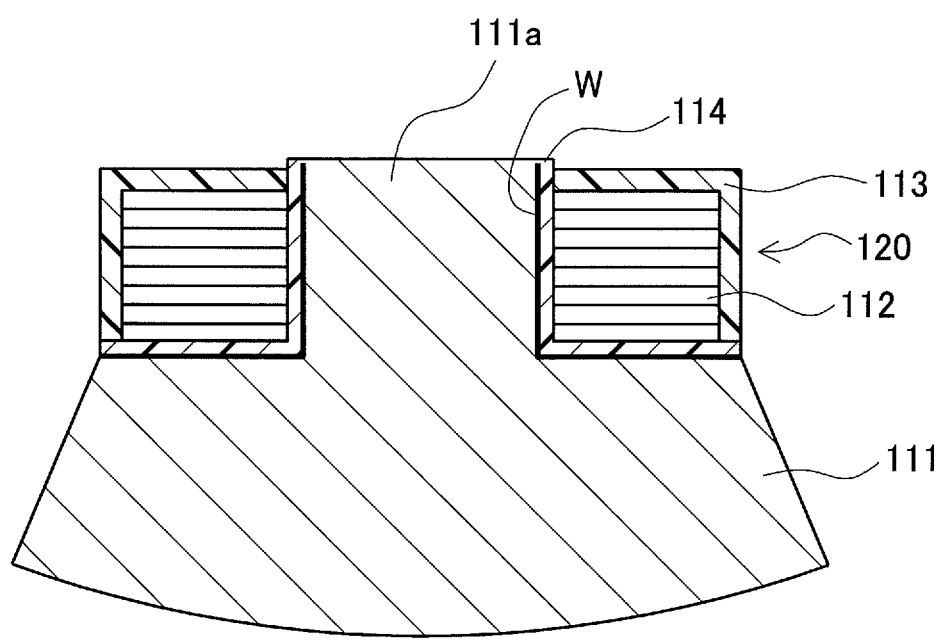
FIG. 14 is a cross sectional view of a stator of a second embodiment.

FIG. 14 is a cross sectional view of the stator 10 of the second embodiment. After the coil unit 120 is formed, portions of the insulator 114 to be placed in contact with the core piece 111 are heated again to be softened. Then, the insulator is hardened while uniform pressure is applied from the inner periphery side of the split-core unit 110 as in the case of the ultrasonic welding shown in FIG. 11, thereby welding the coil unit 120 to the core piece 111. At that time, a simple jig for supporting the outer peripheral surface of the core piece 111 is used instead of the ultrasonic vibrator 130 in order to receive the force of the pressure unit 131.

As above, a weld layer W is formed between the core piece 111 and the insulator 114 of the coil unit 120 as shown in FIG. 12, thereby thermally welding the side surfaces of the teeth portion 111a of the core piece 111 to the corresponding surfaces of the insulator 114 of the coil unit 120. The stator 10 completed as above can provide the same effects obtained by the stator 10 of the first embodiment.

As another embodiment, it is conceivable to use an adhesive instead of performing the heat welding. Specifically, an adhesive is applied to respective contact portions of the insulator 114 and the core piece 111 and then they are pressurized to be joined to each other by use of the pressure unit 131. Thus, the same effects as those obtained by the ultrasonic welding and heat welding can be provided.

Although the present invention is explained in the above embodiments, the invention is not limited thereto and may be embodied in other specific forms without departing from the essential characteristics thereof.

For instance, the first and second embodiments are directed to the split-type stator 10 consisting of the stator core pieces 111. As an alternative, a single-piece stator core may be used. This configuration can restrain the occurrence of eddy current in return for assembling easiness of the coil unit 120. This contributes to improvement of the performance of a motor containing the stator 10.

Furthermore, the concrete materials disclosed in the first and second embodiments may be changed to other materials having the same function as above. The structure of the stator 10 also may be changed within a scope of design variation.

DESCRIPTION OF THE REFERENCE SIGNS

10 Stator
102 Outer ring
110 Split-core unit
111 Core piece
111a Teeth portion
111b Stator core end face
111c Slot bottom portion
111d Outer peripheral surface
112 Coil
112a Outside coil terminal
112b Inside coil terminal
113 Resin-molded portion
113a End-face contact portion
114 Insulator
114a Sleeve portion
114b Plate-like portion
120 Coil unit
130 Ultrasonic vibrator
131 Pressure unit
150 Space
D Flat rectangular conductor wire
F Contraction force

The invention claimed is:

1. A stator manufacturing method of forming a stator by mounting a coil on a teeth portion formed in a stator core through an insulator, the method comprising:
  mounting the coil on the insulator, the insulator having been formed in a shape that contacts with a side surface of the teeth portion and provides a space between the insulator and an end face of the teeth portion,
  placing the coil mounted on the insulator in a molding die,
  injecting a resin into the molding die containing the coil mounted on the insulator to cover a surface of the coil a resin-molded portion by resin molding to form a coil unit, such that, when the coil unit is mounted on the teeth portion, the resin is not in the space between the insulator and the end face of the teeth portion,
  mounting the coil unit on the teeth portion of the stator core, and
  bonding or welding the coil unit and the side surface of the teeth portion, wherein
    the insulator is placed between the resin-molded portion and the stator core, and
    the insulator and the resin-molded portion are not in contact with the end face of the teeth portion.

2. The stator manufacturing method according to claim 1, wherein the resin used to cover the surface of the coil by resin molding is different from a resin used to form the insulator.

3. The stator manufacturing method according to claim 2, wherein a portion of the insulator exposed to an inner peripheral surface of the coil unit and the side surface of the teeth portion of the stator core are joined to each other by one of adhesive, heat welding, and ultrasonic welding.

4. The stator manufacturing method according to claim 1, wherein a portion of the insulator exposed to an inner peripheral surface of the coil unit and the side surface of the teeth portion of the stator core are joined to each other by one of adhesive, heat welding, and ultrasonic welding.

5. The stator manufacturing method according to claim 4, wherein the coil unit is joined by applying uniform pressure to the coil unit from an inner diameter side of the stator core.

* * * * *